United States Patent
Manzella

(10) Patent No.: US 10,115,173 B1
(45) Date of Patent: Oct. 30, 2018

(54) SYSTEM AND METHOD FOR STANDARDIZED EVALUATION OF DRIVER'S LICENSE ELIGIBILITY

(71) Applicant: Allstate Insurance Company, Northbrook, IL (US)

(72) Inventor: Matthew James Manzella, Glen Ellyn, IL (US)

(73) Assignee: Allstate Insurance Company, Northbrook, IL (US)

(*) Notice: Subject to any disclaimer, the term of this patent is extended or adjusted under 35 U.S.C. 154(b) by 375 days.

(21) Appl. No.: 14/494,155

(22) Filed: Sep. 23, 2014

(51) Int. Cl.
  G09B 9/04     (2006.01)
  G06Q 50/26    (2012.01)
  G06Q 30/00    (2012.01)

(52) U.S. Cl.
  CPC .......... *G06Q 50/26* (2013.01); *G06Q 30/018* (2013.01)

(58) Field of Classification Search
  CPC ............................. G09B 9/04; G09B 19/167
  USPC .......................................................... 434/62
  See application file for complete search history.

(56) References Cited

U.S. PATENT DOCUMENTS

| | | |
|---|---|---|
| 8,297,977 B2 | 10/2012 | Freund |
| 8,598,977 B2 | 12/2013 | Maalouf et al. |
| 2005/0273621 A1 | 12/2005 | Davis |
| 2007/0015117 A1 | 1/2007 | Freund et al. |
| 2008/0254417 A1 | 10/2008 | Mohamed |
| 2010/0157061 A1 | 6/2010 | Katsman et al. |
| 2012/0135382 A1* | 5/2012 | Winston ............... G09B 19/167 434/65 |
| 2013/0006675 A1 | 1/2013 | Bowne et al. |
| 2013/0316311 A1 | 11/2013 | England |
| 2013/0332004 A1 | 12/2013 | Gompert et al. |
| 2014/0032062 A1 | 1/2014 | Baer et al. |

(Continued)

FOREIGN PATENT DOCUMENTS

| | | |
|---|---|---|
| KR | 20000058276 A | 10/2000 |
| KR | 20010034971 A | 5/2001 |
| KR | 100299656 B1 | 6/2001 |

(Continued)

OTHER PUBLICATIONS

Tickets and Points, Missouri Department of Revenue, http://dor.mo.gov/faq/drivers/points.php#pointsystem, retrieved from the internet on Jun. 16, 2014, 10 pages.

(Continued)

*Primary Examiner* — Robert P Bullington
(74) *Attorney, Agent, or Firm* — Banner & Witcoff, Ltd.

(57) ABSTRACT

Systems and methods are provided for standardized evaluation of new drivers seeking driver's licenses. A driving license acquisition system may determine the requirements for a new driver to obtain a full driver's license in a particular state, track the driver's driving performance to determine when the requirements are met, and administer a written test and a driving test. Upon passing the written test and the driving test, the driving license acquisition system may communicate with a driver's license issuing authority system (e.g., Department of Motor Vehicles) to recommend issuing a driver's license to the driver. The driving license acquisition system may reduce the need for a parent or other supervisor to monitor the new driver's driving record, and may reduce the need for the new driver visiting a local driver's license issuing authority to obtain a driver's license.

20 Claims, 4 Drawing Sheets

(56) References Cited

U.S. PATENT DOCUMENTS

2014/0099607 A1    4/2014   Armitage et al.

FOREIGN PATENT DOCUMENTS

KR      20010087014 A    9/2001
WO       2008132726 A1   11/2008

OTHER PUBLICATIONS

The Points System, Commonwealth of Virginia Department of Motor Vehicles, http://webcache.googleusercontent.com/search?q=cache:gK7jQx7e6TEJ:https://www.dmv.state.va.us/drivers/###points_you.asp+&cd=1&hl=en&ct=clnk, retrieved from the internet on Jun. 16, 2014, 3 pages.

DMV Point System, Driver's License Points & Traffic Ticket Penalties, http://www.dmv.org/point-system.php, retrieved from the internet on Jun. 16, 2014, 2 pages.

Direct Auto Insurance Goes Mobile with New DirectDrive App and Text Message Payment, http://www.directgeneral.com, Nov. 25, 2013.

* cited by examiner

SYSTEM AND METHOD FOR STANDARDIZED EVALUATION OF DRIVER'S LICENSE ELIGIBILITY

BACKGROUND

Typically, individuals looking to obtain a driver's license are required to enroll in a driver's education course at a driving school, and satisfy additional local requirements. Upon completion of the driver's education course and the local requirements, individuals are generally required complete a written evaluation and a driving evaluation, administered by a local driver's license issuing authority (e.g., a Department of Motor Vehicles, i.e., DMV). The driver's education course and the evaluations currently require humans (e.g., a driving school instructor, parent, guardian, supervisor, DMV evaluator, etc.) to monitor, track, and evaluate the driver's performance. Thus, current evaluation methods inject subjectivity and bias into the process and require the involvement of multiple individuals. Given the continuing increase of travel, especially international and interstate travel, it would be preferred to have a standardized process to evaluate new drivers.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides a driving license evaluation system. The driving license evaluation system may include at least one processor. The driving license evaluation system may be configured to, in operation, obtain a set of requirements to be completed for acquiring a driver's license, receive vehicle operation data associated with a vehicle, determine whether the set of requirements has been satisfied based on the vehicle operation data received, administer a written test responsive to determining the set of requirements has been satisfied, determine whether a written test result for the written test is a passing written test result, administer a driving test responsive to determining the written test result is a passing written test result, wherein the driving test indicates a driving route, receive vehicle operation data associated with the vehicle during performance of the driving test, determining a driving test result based at least in part on a comparison of at least a portion of the vehicle operation data received during performance of the driving test to the driving route, and communicate the written test result and the driving test result to a remote system. Further, the driving license evaluation system may be configured to, in operation, provide a recommendation to the remote system indicating whether a driver's license should be issued based on at least the written test result and the driving test result.

A second aspect described herein provides a computer-assisted method of evaluating a new driver for a driver's license. A computing system may obtain a set of requirements to be completed acquiring a driver's license, receive vehicle operation data associated with a vehicle, determine whether the set of requirements has been satisfied based on the vehicle operation data received, administer a written test responsive to determining the set of requirements has been satisfied, determine whether a written test result for the written test is a passing written test result, administer a driving test responsive to determining the written test result is a passing written test result, wherein the driving test indicates a driving route, receive vehicle operation data associated with the vehicle during performance of the driving test, determining a driving test result based at least in part on a comparison of at least a portion of the vehicle operation data received during performance of the driving test to the driving route, and communicate the written test result and the driving test result to a remote system. Further, the computing system may provide a recommendation to the remote system indicating whether a driver's license should be issued based on at least the written test result and the driving test result.

The details of these and other aspects of the disclosure are set forth in the accompanying drawings and description below. Other features and advantages of aspects of the disclosure will be apparent from the description and drawings.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Aspects of the present disclosure are directed toward a driving license acquisition system. The driving license acquisition system may determine the requirements a new driver must satisfy to obtain a fully qualified driver's license in a particular state, track the driver's driving performance to determine when the requirements are met, and administer a written test and a driving test for the new driver. Upon passing the written test and the driving test, the driving license acquisition system may communicate with a driver's license issuing authority system (e.g., Department of Motor Vehicles) to recommend issuing a driver's license to the driver. The driving license acquisition system may reduce the need for a parent or other supervisor to monitor the new driver's driving record, and may reduce the need for the new driver visiting a local Department of Motor Vehicles to obtain a driver's license.

As will be appreciated by one of skill in the art upon reading the follow disclosure, various aspects described herein may be embodied as a method, a computer system, or a computer program product. Accordingly, those aspects may take the form of an entirely hardware embodiment, an entirely software embodiment, or an embodiment combining software and hardware aspects. Furthermore, such aspects may take the form of a computer program stored by one or more non-transitory computer-readable storage media having computer-readable program code, or instructions, embodied in or on the storage media. Any suitable non-transitory computer readable storage media may be utilized, including hard disks, CD-ROMs, optical storage devices, magnetic storage devices, and/or any combination thereof. In addition, various signals representing data or events as described herein may be transferred between a source and a destination in a form or electromagnetic waves traveling through signal-conducting media such as metal wires, optical fibers, and/or wireless transmission (e.g., air and/or space) such that the source and destination are in signal communication with each other.

Moreover, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof, as well as additional items and equivalents thereof. Furthermore a set, as used in this description, refers to a collection of one or more elements.

Figure 1:
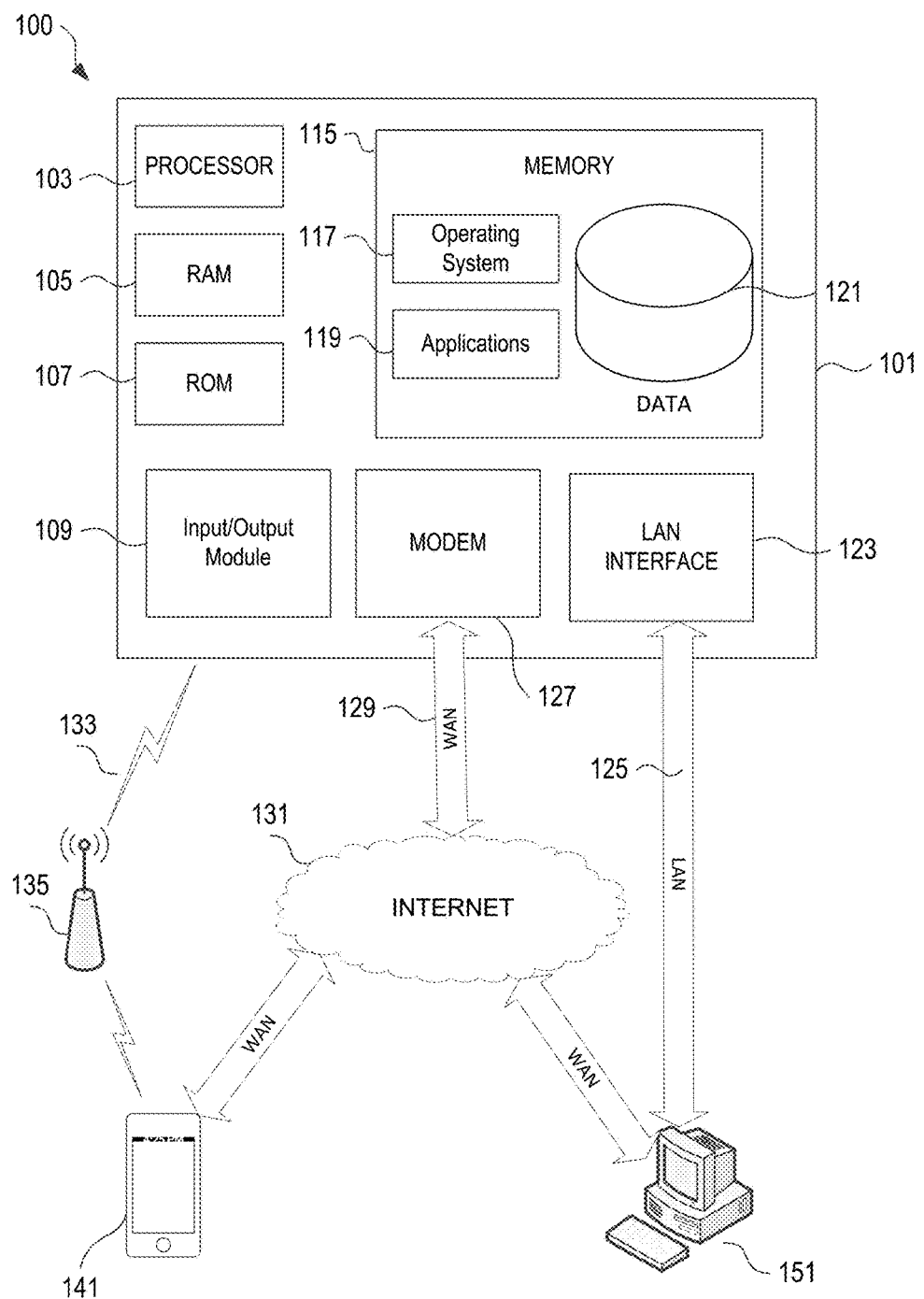
FIG. 1 illustrates a network environment and computing systems that may be used to implement aspects of the disclosure.

FIG. 1 illustrates a block diagram of a computing device 101 in a driving license acquisition system 100 that may be used according to one or more illustrative embodiments of the disclosure. A driving school rating device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as a driving school rating computing devices or systems, configured as described herein for determining licensing requirements, tracking driver performance data, and administering written tests and driving tests.

Input/Output (I/O) devices 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the traffic management system 101 to execute a series of computer-readable instructions to determine licensing requirements, receive driver performance data, and administer written tests and driving tests.

The driving school rating computing device 101 may operate in a networked environment 100 supporting connections to one or more remote computers, such as terminals/devices 141 and 151. Driving school rating computing device 101, and related terminals/devices 141 and 151, may include devices installed in vehicles, mobile devices that may travel within vehicles, or devices outside of vehicles that are configured to receive and process vehicle and vehicle operation data. Thus, the driving school rating computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the driving school rating computing device 101. The network connections depicted in FIG. 1A include a local area network (LAN) 125 and a wide area network (WAN) 129, and a wireless telecommunications network 133, but may also include other networks. When used in a LAN networking environment, the driving school rating computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein may be configured to communicate using any of these network protocols or technologies.

Additionally, one or more application programs 119 used by the driving school rating computing device 101 may include computer executable instructions (e.g., instructions for licensing requirements determination programs, driver performance data analysis programs, test administration programs) for determining licensing requirements, tracking driver performance data, and administering written and driving tests, and performing other related functions as described herein.

Figure 2:
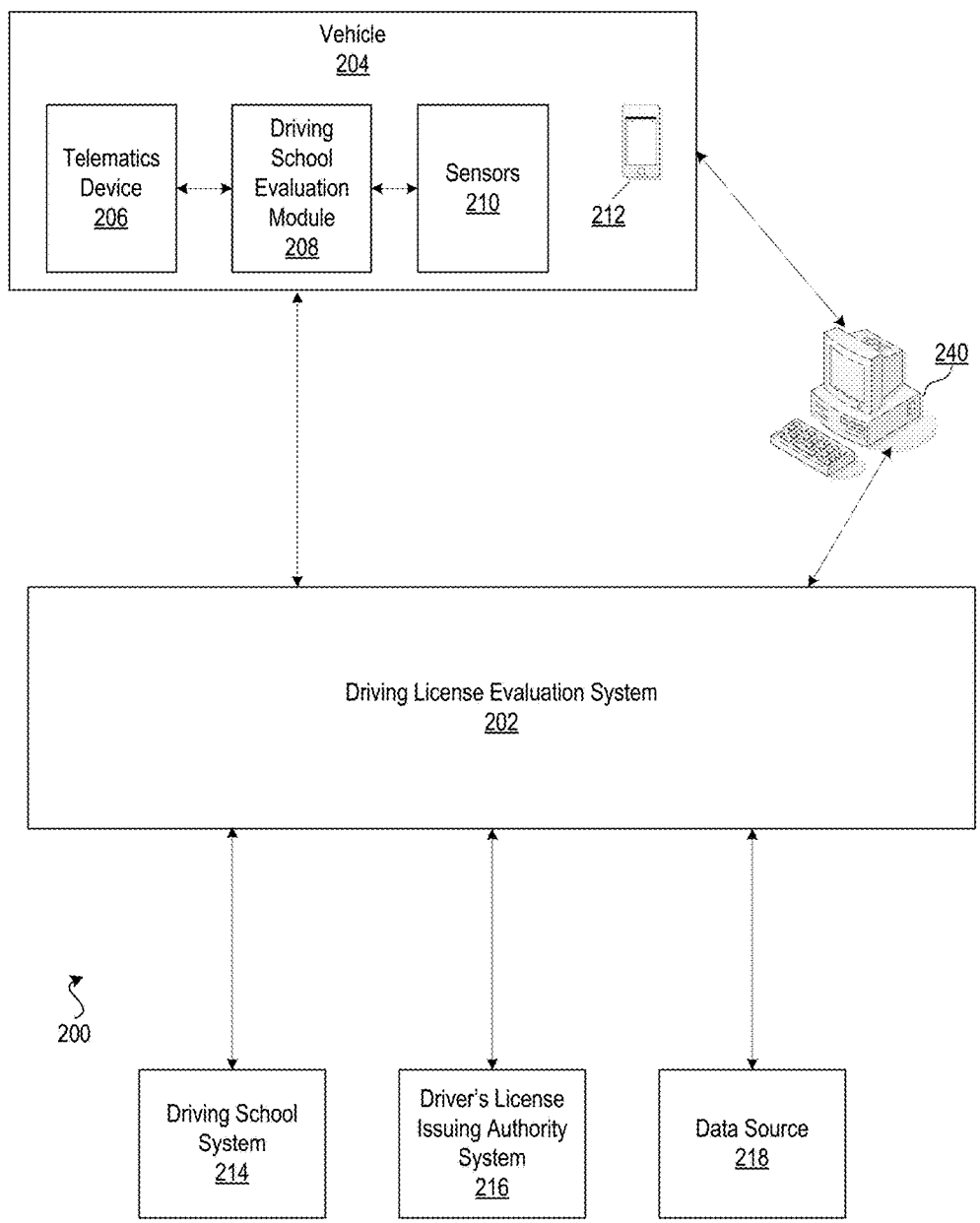
FIG. 2 is a block diagram illustrating various components and devices associated with an example driving license acquisition system, according to one or more aspects of the disclosure.

FIG. 2 is an illustration of an example implementation of a driving license acquisition system 200. The system 200 may include a driving license evaluation system 202. The driving license evaluation system 202, described in further detail below, may determine whether a new driver has met the requirements to be eligible for a driver's license, and may administer the written tests and driving tests automatically. The driving license evaluation system 202 may determine whether a new driver has met the requirements based on vehicle operation data. Vehicle operation data, as used in this description, refers to how a driver operates a vehicle with respect to, e.g., accelerating, decelerating, braking, turning, signaling, lane usage, adequate spacing, speed adherence, distraction management, and other driving-related operations performed by the driver at the vehicle. A vehicle operation data collection device may be installed at, attached to, and/or in signal communication with a vehicle and/or various systems and/or components of the vehicle.

The driving school evaluation system 202 may contain some or all of the hardware/software components as the computing device 101 depicted in FIG. 1. The driving school evaluation system 202 may include hardware, software, and network components to receive vehicle driving data from one or more vehicles 204, such that the information may be received (i) from devices installed at and attached to the vehicle, (ii) from devices located in the vehicle during its operation (e.g., a mobile phone), or (iii) from devices located remotely relative to the vehicle that received the vehicle operation data "from the vehicle" as described in (i) and (ii). The driving school evaluation system 202 may also include hardware software, and network components to send and receive data to and from a driving school system 214, one or more driver's license issuing authority systems 216, and other data sources. The driving license evaluation system 202 may initiate communication with and/or retrieve driving data from a vehicle 204 wirelessly via telematics devices 206, mobile devices 212, or by way of separate computing systems (e.g., computer 240) over one or more computer networks (e.g., the Internet). Additionally, the driving license evaluation system 202 may receive additional data relevant to driving license requirements from other non-vehicle data sources 218, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.).

In some examples, the driving license evaluation system 202 may acquire information about a vehicle directly from the vehicle 204, where the vehicle operation data may be generated at the vehicle 204 itself. The vehicle 204 may be, for example, an automobile, motorcycle, scooter, bus, recreational vehicle, boat, bicycle, or other vehicle for which a vehicle operation data may be analyzed and for which driving license requirement determinations may be made. The vehicle 204 may include one or more sensors 210, which are capable of detecting and recording various conditions at the vehicle and operational parameters of the vehicle. For examples, sensors 210 may detect and store data corresponding to the vehicle's location (e.g., GPS coordinates), speed and direction, rates of acceleration or braking, and specific instances of sudden acceleration, braking, and swerving. Sensors 210 also may detect and store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Vehicles sensors 210 also may include cameras and/or proximity sensors capable of recording additional conditions inside or outside of the vehicle 204. For example, internal cameras may detect conditions such as the number of the passengers and the types of passengers (e.g., adults, children, teenagers, pets, etc.) in the vehicles, and potential sources of driver distraction within the vehicle (e.g., pets, phone usage, unsecured objects in the vehicle). Sensors 210 also may be configured to collect data a driver's movements or the condition of a driver. For example, the vehicle 204 may include sensors that monitor a driver's movements, such as the driver's eye position and/or head position, etc. Additional sensors 210 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

Certain vehicle sensors 210 also may collect information regarding the driver's route choice, whether the driver follows a given route, and to classify the type of trip (e.g., commute, errand, new route, etc.). A Global Positioning System (GPS), locational sensors positioned inside the vehicle 104, and/or locational sensors or devices external to the vehicle 104 may be used determine the route, lane position, and other vehicle position/location data.

The data collected by vehicle sensors 210 may be stored and/or analyzed within the respective vehicle 204, and/or may be transmitted to one or more external devices. For example, as shown in FIG. 2, sensor data may be transmitted to a driving school evaluation module 208, which may be separate computing devices or may be integrated into one or more components within the vehicle 204, such as the telematics device 206, or in the internal computing systems of the vehicle 204. Additionally, the sensor data may be transmitted via a telematics device 206 to one or more remote computing devices, such as a driving license evaluation system 202. A telematics device 206 may be a computing device containing many or all of the hardware/software components as the computing device 101 depicted in FIG. 1. As discussed above, the telematics device 206 may receive vehicle operation data and driving data from vehicle sensors 210, and may transmit the data to one or more external computer systems (e.g., driving license evaluation system 202 of an insurance company, financial institution, or other entity) over a wireless transmission network. Telematics devices 206 also may be configured to detect or determine additional types of data relating to real-time driving and the condition of the vehicle 204. In certain embodiments, the telematics device 206 may contain or may be integral with one or more of the vehicle sensors 210. The telematics device 206 also may store the type of their respective vehicle 204, for example, the make, model, trim (or sub-model), year, and/or engine specifications, as well as other information such as vehicle owner or driver information, insurance information, and financing information for the vehicle 104.

In the example shown in FIG. 2, the telematics device 206 may receive vehicle operation data from vehicle sensors 210, and may transmit the data to a driving license evaluation system 202. However, in other examples, one or more of the vehicle sensors 210 may be configured to transmit data directly to a driving license evaluation system 202 without using a telematics device 206. For instance, a telematics device 206 may be configured to receive and transmit data from certain vehicle sensors 210, while other sensors may be configured to directly transmit data to a driving license evaluation system 202 without using the telematics device 206. Thus, telematics devices 206 may be optional in certain embodiments.

In certain embodiments, a mobile computing device 212 within the vehicle 204 may be used to collect vehicle operation data and/or to receive vehicle operation data from sensors 210, and then to transmit the vehicle operation data to the driving license evaluation system 202 and other external computing devices. Mobile computing device 212 may be, for example, mobile phones, personal digital assistants (PDAs), or tablet computers of the drivers or passengers of the vehicle 204. Software applications executing on the mobile devices 212 may be configured to detect vehicle operation data independently and/or may communicate with vehicle sensors 210 to receive additional vehicle operation data. For example, the mobile device 212 equipped with GPS functionality may determine vehicle location, speed, direction and other basic vehicle operation data without needing to communicate with the vehicle sensors 210, or any vehicle system. In other examples, software on the mobile device 212 may be configured to receive some or all of the vehicle operation data collected by vehicle sensors 210.

When the mobile computing device 212 within the vehicle 204 is used to detect vehicle operation data and/or to receive vehicle operation data from the vehicle 204, the mobile computing device 212 may store, analyze, and/or transmit the vehicle operation data to one or more other devices. For example, the mobile computing device 212 may transmit vehicle operation data directly to a driving license evaluation system 202, and thus may be used in conjunction with or instead of the telematics device 206. Moreover, the processing components of the mobile computing device 212 may be used to determine a set of one or more licensing requirements, analyze vehicle operation data, track requirements, administer tests, and perform other related functions. Therefore, in certain embodiments, the mobile computing device 212 may be used in conjunction with, or in place of, the driving school evaluation module 208.

The vehicle 204 may include a driving school evaluation module 208, which may be separate computing devices or may be integrated into one or more other components within the vehicle 204, such as the telematics device 206, or the internal computing systems of the vehicle 204. As discussed above, the driving school evaluation module 208 also may be implemented by computing devices independent from the vehicle 204, such as the mobile computing devices 212 of the drivers or passengers, or one or more separate computer systems 240 (e.g., a user's home or office computer). In any of these examples, the driving school evaluation module 208 may contain some or all of the hardware/software components as the computing device 101 depicted in FIG. 1. Further, in certain implementations, the functionality of the driving school evaluation module 208, such as storing and analyzing vehicle operation data, tracking licensing requirements, and administering the written and driving tests, may be performed in a driving license evaluation system 202 rather than by the individual vehicle 204. In such implementations, the vehicle 204 might only collect and transmit vehicle operation data to a driving license evaluation system 202, and thus the vehicle-based driving school evaluation module 208 may be optional.

The driving school evaluation module 208 may be implemented in hardware and/or software configured to receive vehicle operation data from the vehicle sensors 210, the telematics device 206, and/or other vehicle operation data sources. After receiving the vehicle operation data, the driving school evaluation module 208 may perform functions to analyze the vehicle operation data, track licensing requirements, and administer tests accordingly. For example, the driving school evaluation module 208 may include one or more vehicle operation data analysis algorithms, which may be executed by software running on computing hardware within the driving school evaluation module 208. Within the driving school evaluation module 208, a requirements tracking function may use the results of the vehicle operation data analysis performed by the module 208 to determine how much progress has been made towards each requirement, and whether any of the requirements have been fully satisfied. Further descriptions and examples of the algorithms, functions, and analyses that may be executed by the driving school evaluation module 208 are described below.

The driving license evaluation system 202 may also acquire information about requirements for obtaining a driver's license. Licensing requirements, as used in this description, refer to the requirements that a new driver must satisfy before the driver is eligible for a driver's license. A new driver, as used in this description, refers to an individual that has not received a fully qualified driver's license. Licensing requirements may differ by country and/or state, such that the driving license evaluation system 202 may be configured with alternative sets of licensing requirements according to the jurisdiction in which the evaluation system is employed. For example, in some jurisdictions, licensing requirements may include 50 hours of practice driving, 10 hours of night driving, 10 hours of highway driving, 5 hours of city driving, etc. Licensing requirements may also include, for example, being clear from traffic violations in the last 6 months. Licensing requirements for each country and/or state may be maintained by the driving school evaluation system 202 or driving school evaluation modules 208. Additionally or alternatively, licensing requirements for each country and/or state may be maintained by a driver's license issuing authority system 216. The driving license evaluation system 202 may be in signal communication with the driver's license issuing authority system 216 via a network. The network may include one or more of a wired network (e.g., the Internet), a wireless network (e.g., a cellular network, Bluetooth, NFC), or a combination of wired or wireless networks. The driving license evaluation system 202 may be in direct communication with a database within the driver's license issuing authority system 216, or may be in indirect communication with a database within the driver's license issuing authority system 216 via a remote service (e.g., a web service). Acquiring licensing requirements from a driver's license issuing authority system 216 advantageously provides that the subsequent determinations made by the driving license evaluation system 202 are based on current requirements of the country and/or state.

The driving license evaluation system 202 may communicate the new driver's performance and status to a driving school system 214. The driving license evaluation system 202 may be in signal communication with the driving school system 214 via a network such as those described above. A driving school, where one or more new drivers may be enrolled, may use the data communicated to the driving school system 214 to create competition among the new drivers and provide rewards. For example, a driving school may use the data to create a leaderboard based on one or more new drivers' performance and status, as related to meeting various licensing requirements. In other examples, a driving school may generate driving performance scores for one or more new drivers based on the vehicle operation data acquired from one or more vehicles 204.

In some examples, the driving license evaluation system 202 may provide an interface for the new driver to track driving performance and status of requirements to obtain a fully qualified driver's license. The interface may be, for example, a web browser, desktop application, mobile application, or the like that resides at the computing device 101. In some examples, the interface may reside on the mobile computing device 212. In other examples, the interface may be accessible through a separate computer 240.

Figure 3:
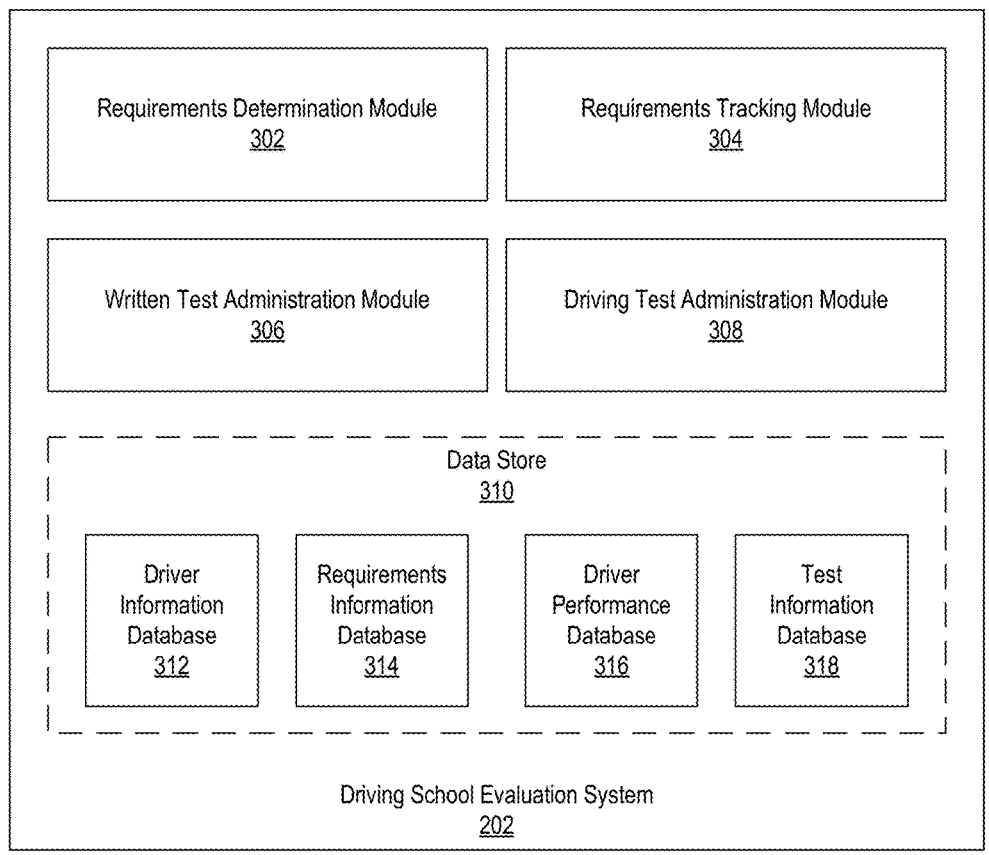
FIG. 3 is a block diagram of an example of an implementation of a driving license evaluation system.

FIG. 3 shows an example implementation a driving license evaluation system 202. The driving school evaluation system 202 may include various components, modules, and sub-systems that facilitate various tasks, including determining a set of requirements for obtaining a driver's license, receiving and analyzing vehicle operation data, tracking completion of requirements based on vehicle operation data, administering a written and driving test upon the completion of all of the requirements, and notifying the driver's license issuing authority system upon successfully completing the written tests and driving tests. It will be appreciated that the driving license evaluation system 202 illustrated in FIG. 3 is shown by way of example and that other implementations of the driving license evaluation system may include additional or alternative components, modules, sub-systems, and so forth. In this example, the driving license evaluation system 202 includes a requirements determination module 302, a requirements tracking module 304, a written test administration module 306, a driving test administration module 308, and a data store 310.

The data store 310 may store information related to licensing requirements, new drivers, new drivers' driving performance, and tests. The data store 310 may include a driver information database 312, a requirements information database 314, driver performance database 316, and a test information database 318. The driving license evaluation system 202 may utilize this information in determining licensing requirements, tracking driving performance, and administering written tests and driving tests.

The driver information database 312 may store information associated with new drivers of vehicles, e.g., name of driver, age of driver, contact information, vehicle identification, etc. In some examples, the driver information database 312 may also store the new driver's status with the driver's license issuing authority (e.g., New Driver, Eligible for Written Test, Eligible for Driving Test, Cleared for Fully Qualified Driver's License).

The requirements information database 314 may store information associated with the requirements to obtain a fully qualified driver's license, e.g., driver's age, total number of driving hours in addition to the driver's education course, number of driving hours at night, number of permitted traffic violations within a given time period, etc. The requirements information database 314 may store requirements associated with different regions, for example, countries, states, and so forth.

The driver performance database 316 may store information associated with a new driver's performance, including vehicle operation data received from the new driver's vehicle or mobile computing device. The driver performance database 316 may enable the driving license evaluation system 202 to track the new driver's progress with respect to the requirements to obtain a fully qualified driver's license. Thus, the driver performance database 316 may maintain, e.g., through a database relationship, an association between a performance metric, a driver in the driver information database 312, and a requirement in the requirements information database 314. For example, the driver performance database 316 may associate a first new driver, a number of driving hours at night, and a metric indicating that the new driver has driven 8 hours at night. The driver performance database 316 may also include performance scores for respective trips taken by the driver, where the scores are determined based on the vehicle operation data collected during those trips. The driver performance database 316 may include an overall performance score that may be the average of the trip scores. In some examples, a requirement in the requirements information database 314 may be associated with a threshold performance score, such that a requirement is not deemed to be satisfied until the driver's performance score meets or exceeds the threshold performance score (e.g., 8 hours of night driving with a performance score at or above 80%).

The test information database 318 may store information associated with written tests and driving tests. With reference to the written tests, the test information database 318 may store the written tests to be administered by the driving license evaluation system 202. Accordingly, the test information database 318 may store at least the test questions, the test answers, and the passing score. The test information database 318 may also store a test identification number such that each test (or a component of a test) may be uniquely identified. The test information database 318 may store written tests associated with different regions (e.g., countries, states, etc.), in light of the variance in road rules. Similarly, with reference to the driving tests, the test information database 318 may store the driving tests to be administered by the driving license evaluation system 202. Accordingly, the test information database 318 may store at least the test route, the required milestones (e.g., speed limit, turns, etc.), and a passing score or performance. The test information database 318 may store driving tests associated with different regions (e.g., countries, states, etc.), in light of the variance in road rules, routes, etc.

It will be appreciated that the requirements information database 314 and the test information database 318 may be optional in some example implementations of a driving license evaluation system 202. For instance, where the driving license evaluation system 202 may acquire the requirements information directly from the driver's license issuing authority system 216, the requirements information database 314 may be duplicative. Likewise, where the driving license evaluation system 202 may acquire the written and driving test information directly from the driver's license issuing authority system 216, the test information database 318 may be duplicative.

Example implementations of the requirements determination module 302, the requirements tracking module 304, the written test administration module 306, and the driving test administration module 308 will be described in further detail below.

Figure 4:
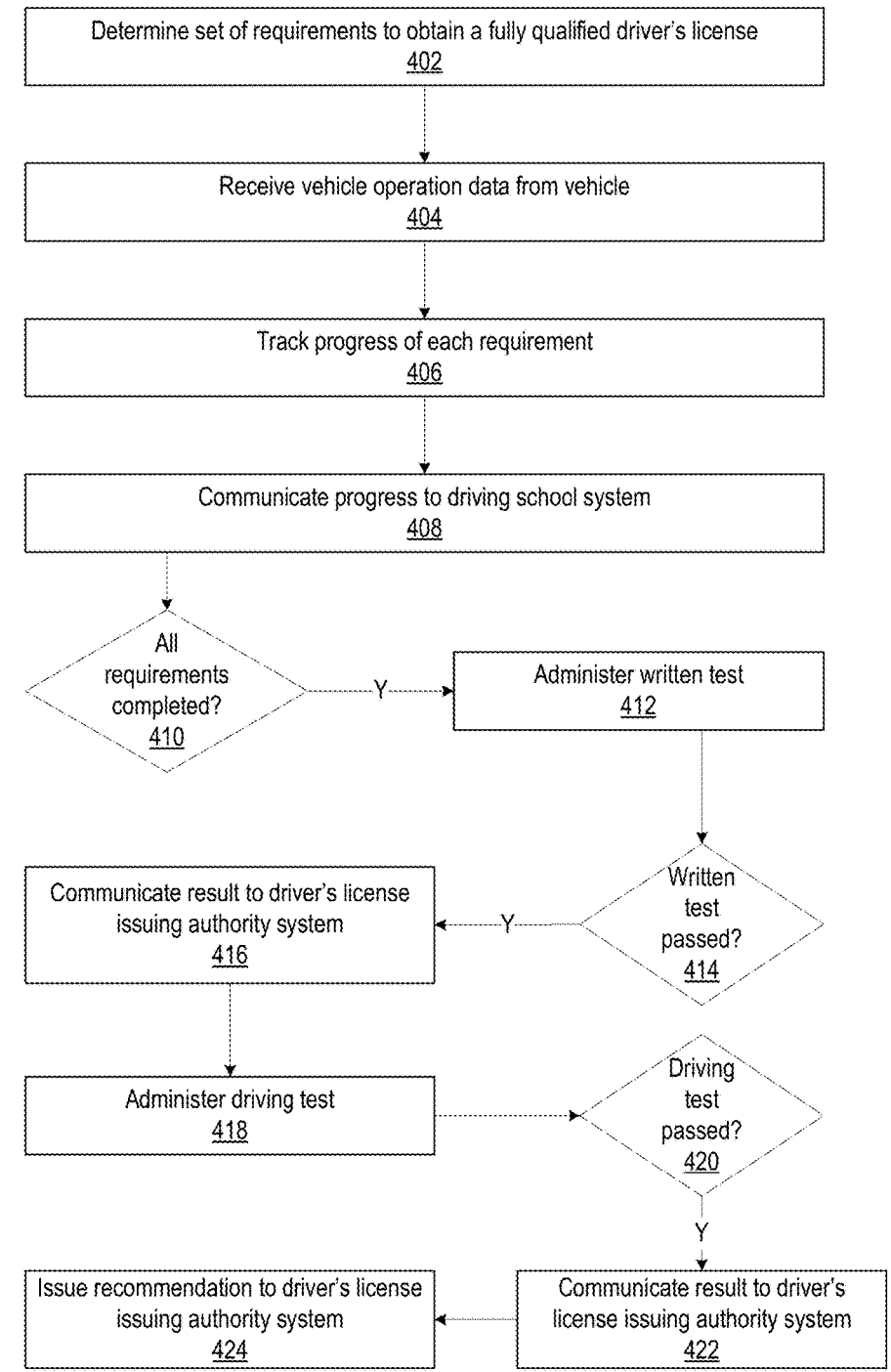
FIG. 4 is a flowchart of example method steps of determining whether a new driver has satisfied the requirements to obtain a driver's license.

Referring now to FIG. 4, a flowchart 400 of high-level example steps for determining whether a new driver has satisfied the requirements to obtain a driver's license is shown. The various components of the driving license evaluation system 202 may be used to perform these method steps. The requirements determination module 302 may determine the set of requirements for a new driver to obtain a fully qualified driver's license (block 402). As discussed earlier, the requirements determination module 302 may retrieve the set of requirements from the requirements information database 314, or directly from the driver's license issuing authority system 216. In both examples, the requirements determination module 302 may retrieve the set of requirements based on multiple factors, including the new driver's location or residence, as indicated by the driver information database 312.

The driving license evaluation system 202 may use the set of requirements acquired by the requirements determination module 302 to determine the new driver's progress toward being eligible for a fully qualified driver's licensed. Accordingly, the requirements tracking module 304 may receive vehicle operation data (block 404). The requirements tracking module 304 may receive the vehicle operation data from the vehicle 204, from a computing device 212, or a combination thereof. The requirements tracking module 304 may then analyze the vehicle operation data to track progress of each requirement (block 406). For example, the requirements tracking module 304 may determine the updated metrics for each requirement (e.g., updated total number of hours driven outside the driver's education course, updated number of driving hours at night, updated number of traffic violations, etc.). The requirements tracking module 304 may update the driver performance database 316 to reflect the current status of each requirement. In some examples, the requirements tracking module 304 may replace the previous metric with the updated metric for a particular requirement in the driver performance database 316. Alternatively, the requirements tracking module 304 may add the updated metric for a particular requirement to the driver performance database 316, while keeping a record of the one or more previous metrics in the driver performance database 316, or in an alternate database, for historical tracking.

The requirements tracking module 304 may report the progress of each requirement to a driving school system (block 408). In some examples, the requirements tracking module 304 may communicate the updated metric for a particular requirement to the driving school system. Additionally or alternatively, where the driving license evaluation system 202 maintains a record of the previous metrics for a particular requirement, the requirements tracking module 304 may also communicate the previous metrics, or the differential between the updated metric and the previous metric.

The requirements tracking module 304 may also determine whether the set of requirements have been satisfied by the new driver (block 410). The requirements tracking module 304 may analyze the driver performance database 316 to make this determination. Where the updated metric meets or exceeds a requirement, the requirements tracking module 304 may determine that the requirement has been satisfied. The requirements tracking module 304 may make this determination for each requirement in the new driver's set of requirements for obtaining a fully qualified driver's license. In some examples, where every requirement in the new driver's set of requirements is determined to be satisfied, the driving license evaluation system 202 determines that the new driver is eligible to take the written test. In other examples, the new driver may be eligible to take the written test where a portion or a predetermined percentage (e.g., 90%) of the requirements are determined to be satisfied. In such examples, the driver may have the option of selecting one of multiple requirements that, if satisfied, may advance the driver toward eligibility for the written test. In some examples, the requirements tracking module 304 may update the driver information database 312 to reflect the driver's completion of the set of requirements to obtain a fully qualified driver's license.

Accordingly, the written test administration module 306 may allow the new driver to take a written test component of the examination to obtain a fully qualified driver's license (block 412). As discussed earlier, the written test administration module 306 may retrieve a written test from the test information database 318, or directly from the driver's license issuing authority system 216. In both examples, the written test administration module 306 may retrieve a written test based on one or more factors, including the new driver's location, as indicated by the driver information database 312. In both examples, the written test administration module 306 may retrieve one or more written tests based on the one or more factors. Where the written test administration module 306 retrieves more than one written test, the written test administration module 306 may select a test based on a randomization algorithm. Additionally or alternatively, the written test administration module 306 may prefer to select a test that has not been previously attempted by the new driver. The driving license evaluation system 202 may maintain a record of previously attempted, but unsuccessfully completed, written tests in, for example, the driver information database 312, the test information database 318, a separate database, or a combination thereof. The use of a randomization algorithm, or other algorithm, may advantageously ensure that the written test presented to the driver accurately tests the driver's understanding of traffic rules and public safety.

In other examples, the written test administration module 306 may retrieve a set of questions from the test information database 318 or directly from the driver's license issuing authority system 216. From the retrieved set of questions, the written test administration module 306 may construct (e.g., dynamically) a written test, for example, based on a randomization algorithm. The constructed written test may also be based on a preference to present questions not previously attempted by the new driver. Additionally or alternatively, the constructed test may include one or more questions indicated to be mandatory by the driver's license issuing authority. The constructed written test may also be based on the vehicle operation data obtained during the driver's operation of the vehicle. For example, if the vehicle operation data indicates that the driver has a habit of failing to signal when making turns, the written test administration module 306 may select questions directed towards the correct usage of signals while operating the vehicle. In another example, if the driver has a habit of hard baking during heavy traffic, or a habit of speeding during adverse weather conditions, the written test administration module 306 may select questions directed towards safe and appropriate driving habits in heavy traffic or adverse weather.

Once a written test is selected or constructed, the written test administration module 306 may provide an interface through which the new driver may take the written test. In some examples, the interface may be at a computing device 212 associated with the vehicle 104, or a separate computing system 240. The new driver may submit the completed written test through these example interfaces. In some examples, the written test administration module 306 may create a timer for the written test. The timer will start when the written test is first accessed through the interface by the new driver, which may be different from when the written test is delivered to the new driver through the interface. The timer may expire after a predetermined period of time after the written test is first accessed through the interface by the new driver. After the expiration of the timer, the new driver may not be able to complete and submit the written test. In other examples, each question of a written test may be associated with a timer, such that the question will be deemed incorrect if the driver fails to provide an answer before the respective timer expires.

The written test administration module 306 may subsequently determine whether the new driver passed the written test (block 414). In some examples, where the driving license evaluation system 202 retrieves the test information from the test information database 318, the written test administration module 306 may compare the new driver's submitted answers to the written test against the test answers from the test information database 318. The new driver's written test score is determined by the number of matches between the new driver's submitted answers and the test answers. Where the new driver's written test score meets or exceeds the passing score, as defined in the test information database 318, the written test administration module 306 may determine that the new driver passed the written test. Where the new driver passed the written test, the written test administration module 306 may communicate the test result to the driver's license issuing authority system 216 (block 416). Alternatively, in other examples, where the driving license evaluation system 202 retrieves the test information from the driver's license issuing authority system 216 directly, the written test administration module 306 may request the driver's license issuing authority system 216 to verify the new driver's answers to the written test. In response, the driver's license issuing authority system 216 may provide whether new driver passed the written test. In these examples, the written test administration module 306 may optionally communicate the test result to the driver's license issuing authority system 216 (block 416). The written test administration module 306 may also update the driver information database 312 to reflect the driver's successful completion of the written test.

Conversely, where the new driver's written test score is below the passing score, as defined by the test information database 318, the written test administration module 306 may determine that the new driver has not passed the written test. To maintain a record of the written tests the driver has unsuccessfully completed, the written test administration module 306 may record test identifying information (e.g., test identification number and question identification numbers) in, for example, the driver information database 312, the test information database 318, or a separate database. In some examples, the new driver may not be permitted to take another written test until additional supplemental requirements are completed. The additional supplemental requirements may be based on the questions the new driver answered incorrectly. For example, where the new driver incorrectly answered questions directed toward nighttime driving, the driver may be prevented from taking another written test until the driver completes an additional x number of hours of nighttime driving.

Upon determining that the new driver has passed the written test component, the driving test administration module 308 may allow the new driver to take a driving test component of the examination to obtain a fully qualified driver's license (block 418). As discussed earlier, the driving test administration module 308 may retrieve a driving test from the test information database 318, or directly from the driver's license issuing authority system 216. In both examples, the driving test administration module 308 may retrieve a driving test based on one or more factors, including the driver's location, as indicated by the driver information database 312. In both examples, the driving test administration module 306 may retrieve one or more driving tests based on the one or more factors. Where the driving test administration module 308 retrieves more than one driving test, the driving test administration module 308 may select a test based on a randomization algorithm. Additionally or alternatively, the driving test administration module 308 may prefer to select a test that has not been previously attempted by the new driver. The driving license evaluation system 202 may maintain a record of previously attempted, but unsuccessfully completed, driving tests in, for example, the driver information database 312, the test information database 318, a separate database, or a combination thereof. The use of a randomization algorithm, or other algorithm, may advantageously ensure that the driving test presented to the driver accurately tests the new driver's driving skills.

In other examples, the driving test administration module 308 may retrieve a set of mini-routes from the test information database 318 or directly from the driver's license issuing authority system 216. A mini-route may be a potential segment of a driving test (e.g., one-way street, two-way street, inclined street, left turn, right turn, U-turn, highway, parking lot, street parking, 3-point turn, etc.). From the retrieved set of mini-routes, the driving test administration module 308 may construct a driving test comprising a contiguous set of mini-routes. A set of mini-routes may be contiguous wherein the end point of a first mini-route is the starting point of a second mini-route. Additionally, in some examples, the starting points of the very first mini-route may be the end point of the very last mini-route. Per at least these requirements, the constructed driving test may be based on a randomization algorithm. The constructed driving test may also be based on a preference to include mini-routes not previously attempted by the new driver. The driving license evaluation system 202 may maintain a record of previously attempted, but unsuccessfully completed, mini-routes in, for example, the driving information database 312, the test information database 318, a separate database, or a combination thereof. Further, the constructed driving test may include one or more mini-routes (e.g., highway, parking lot, street parking, 3-point turn, etc.) indicated to be mandatory by the driver's license issuing authority. In some examples, the driving test administration module 308 may retrieve information from external data sources 218 when selecting mini-routes to construct a driving test route. For example, the driving test administration module 308 may query a traffic information database in order to direct the driver toward areas having particular traffic conditions (e.g., low traffic, moderate traffic, high traffic).

Further, the driving test administration module 308 may construct a driving test based on an expected difficulty level of the driving test route. In these examples, a mini-route may be associated with a difficulty level (e.g., Easy/Medium/Hard, 1-10, etc.). Where a driving test comprises a set of mini-routes, the driving test administration module 308 may determine the difficulty level of a driving test based on the difficulty levels of the individual mini-routes (e.g., average of mini-routes' difficulty levels, maximum of mini-routes' difficulty levels, etc.). The driving test administration module 308 or driver's license issuing authority system 216 may prescribe a minimum difficulty level and/or a maximum difficulty level. Thus, the driving test administration module 308 may only administer driving tests with difficulty levels equal to or exceeding the minimum difficulty level, where a minimum difficulty level is prescribed. Additionally or alternatively, the driving test administration module 308 may only administer driving tests with difficulty levels equal to or less than the maximum difficulty level, where a maximum difficulty level is prescribed. Thus, the driving test administration module 308 may dynamically adjust the difficulty level of the driving test route by selecting a mini-routes associated with various difficulty levels. For example, the driving test administration module 308 may select a low traffic mini-route to construct a relatively easy driving test, or by selecting a high traffic mini-route to construct a relatively challenging driving test. The driving test administration module 308 may require a new driver to pass multiple driving tests of escalating difficulty (e.g., a first easy driving test, a second moderate driving test, a third hard driving test).

Once a driving test is selected or constructed, the driving test administration module 308 may provide an interface through which the new driver may view and follow the driving test. The interface may be at a computing device 212 associated with the vehicle 204. The new driver may follow the driving test instructions (e.g., driving test route) through the interface, and may complete the driving test using the vehicle 204. The interface may be a visual output interface, an audio output interface, or a combination thereof. The visual output interface may provide written instructions (e.g., "make a lane change to the left," "make a left turn at the next intersection," etc.). The visual output interface may also provide a map of the driving test route in conjunction with the written instructions. The audio output interface may provide audible instructions (e.g., "make a lane change to the left," "make a left turn at the next intersection," etc.). The audible instructions may originate from the driver's mobile device or through the speakers of the vehicle. In some examples, the driving test administration module 308 may create a timer for the driving test. The timer will start when the driving test is first attempted through the vehicle 204, which may be different from when the driving test is delivered to the new driver through the interface. For example, the timer may start when the vehicle 204 first starts moving along the route prescribed by the driving test. In other examples, the timer may start when the driver of the vehicle 204 indicates, through the interface, that the driver is starting the driving test. The timer may expire after a predetermined period of time after the driving test is first attempted through the vehicle 204 by the new driver. After the expiration of the timer, the new driver may not be able to successfully complete and submit the driving test.

Once the test is started, the driving test administration module 308 may determine whether the new driver passed the driving test (block 420). Accordingly, the driving test administration module 308 may receive vehicle operation data from the vehicle 204 to determine the driver's performance in relation to the driving test's requirements. For example, the driving test administration module 308 may compare the vehicle's 204 location (e.g., GPS coordinates) to the route prescribed by the driving test. The driving test route may be defined by a set of contiguous GPS coordinates (i.e., expected GPS coordinates), which may be compared to the vehicle's 204 location (i.e., actual GPS coordinates). The driving test administration module 308 may perform this comparison at regular intervals (e.g., every 5 seconds, every 100 meters, every intersection, etc.), in response to vehicle operation data (e.g., change of direction, turns, etc.), in response to a transition from a first mini-route to a second mini-route, or continuously. Alternatively, the driving route and/or mini-routes may define checkpoints at which the driving test administration module 308 may perform this comparison. In some examples, where the expected GPS coordinates differ from the actual GPS coordinates, the driving test administration module 308 may determine that the driver of the vehicle 204 has not passed the driving test. In other examples, the driving test administration module 308 may allow for a predetermined permitted variance between the expected GPS coordinates and the actual GPS coordinates. Thus, in such examples, where the expected GPS coordinates differ from the GPS coordinates by a distance less than or equal to the predetermined permitted variance, the driving test administration module 308 may not determine that the driver of the vehicle 204 has not passed the driving test.

The driving test administration module 308 may also track the vehicle's 204 compliance with prescribed speed limits. Accordingly, in some examples, the driving test administration module 308 may compare the speed limit with the vehicle's 204 speed (i.e., actual speed). The speed limit may be associated with GPS coordinates, a mini-route, etc. The driving test administration module 308 may perform this comparison at regular intervals (e.g., every 5 seconds, every 100 meters, every intersection, etc.), in response to vehicle operation data (e.g., change in direction, turns, etc.), in response to a transition from a first mini-route to a second mini-route, or continuously. Alternatively, the driving route and/or mini-routes may define checkpoints at which the driving test administration module 308 may perform this comparison. In some examples, where the actual speed exceeds the speed limit, the driving test administration module 308 may determine that the driver of the vehicle 204 has not passed the driving test. In other examples, the driving test administration module 308 may allow for a predetermined permitted variance between the speed limit and the actual speed. Thus, in such examples, where the actual speed exceeds the speed limit by an amount less than or equal to the predetermined permitted variance, the driving test administration module 308 may not determine that the driver of the vehicle 204 has not passed the driving test.

In addition to tracking the vehicle's 204 location and speed, the driving test administration module 308 may also track compliance with other driving test requirements using vehicle operation data. Relevant vehicle operation data may include evidence of sudden acceleration/braking, swerving, impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, and other data collected by the vehicle's 204 sensors 210 and other computer systems. For example, the driving test administration module 308 may determine that the driver of the vehicle 204 has not passed the driving test, where the vehicle operation data indicates that vehicle 204 frequently accelerated/braked suddenly, experienced a collision, turned improperly (e.g., no turn signal usage, no rear/side mirror usage, etc.), drove at night without using headlights, drove in the rain without using windshield wipers, drove without using a seat belt, drove while fatigued or intoxicated, used a cell phone (with the exception of a mobile application tracking the driver's performance on the driving test) or radio, and so forth.

In some examples, where the vehicle operation data indicates that the vehicle 204 has violated at least one requirement (e.g., location, speed limit, braking, cell phone usage, and so forth), the driving test administration module 308 may instantly determine that the driver of the vehicle 204 has not passed the test, and interrupt the driving test. Interruption of the driving test may be communicated to the driver of the vehicle 204 through the interface. In some examples, where the violation is severe, the driving test administration module 308 may require the driver of the vehicle 204 to pull over and stop driving. Failure to comply with these instructions may result in the driving test administration module 308 communicating such failure to the driver's license issuing authority, which may result in the suspension (temporary or permanent) of driving privileges or suspension (temporary or permanent) of the ability to obtain a driver's license through the driving license evaluation system 202. The driving license evaluation system 202 may record any such suspensions in the driver information database 312, which may prevent the driving test administration module 308 from administering any further driving tests for this driver, until such suspension is removed. Such suspension may ensure safety of the new driver and the general public.

Thus, where the vehicle 204 successfully follows the route prescribed by the driving test, at an appropriate speed, while complying with other driving test requirements (e.g., no hard braking, no cell phone usage, and so forth), the driving test administration module may determine that the driver of the vehicle 204 has successfully completed the driving test.

It will be appreciated that the new driver's performance with respect to the driving test may be determine in real-time (i.e., while the driving test is still in progress), or upon completion of the driving test. In examples where the new driver's performance is evaluated upon completion of the driving test, the driving test administration module 308 may maintain record of the driver's performance (e.g., GPS coordinates, speed, other vehicle operation data) in the driver performance database 316, a separate database, or a combination thereof.

Where the new driver does not pass the driving test, the driving test administration module 308 may record test identifying information (e.g., test identification numbers, mini-route identification numbers) in, for example, the driver information database 312, the test information database 318, or a separate database. In some examples, the new driver may not be permitted to take another driving test until additional supplemental requirements are completed. The additional supplemental requirements may be based on the one or more instructions or mini-routes of the driving test the driver is determined to have failed. For example, where the new driver failed left turn instructions during the driving test, the driver may be prevented from taking another driving test until the driver practices and successfully completes x number of left turns.

Conversely, where the new driver passes the driving test (in addition to passing the written test) (block 420), the driving test administration module 308 may communicate the test result to the driver's license issuing authority system 216 (block 422). Alternatively, in other examples, where the driving license evaluation system 202 retrieves the test information from the driver's license issuing authority system 216 directly, the driving test administration module 308 may request the driver's license issuing authority system 216 to verify the new driver's performance on the driving test. In response, the driver's license issuing authority system 216 may provide whether the new driver has passed the driving test. In these examples, the driving test administration module 308 may optionally communicate the test result to the driver's license issuing authority system 216 (block 422). The driving test administration module may also update the driver information database 312 to reflect the driver's successful completion of the driving test.

Where the new driver passes the driving test, the driving test administration module 308 may also communicate with the driver's license issuing authority system 216 to recommend issuing a fully qualified driver's license to the new driver (block 424). In some examples, the driver's license issuing authority system 216 may automatically issue a driver's license to the new driver, upon receipt of the recommendation from the driving license evaluation system 202. Accordingly, the driver's license issuing authority system 216 may request the driving license evaluation system 202 to provide additional information about the new driver necessary to issue the license (e.g., name, age, gender, weight, facial characteristics, blood type, willingness to be an organ donor, e-signature, etc.). The driving license evaluation system 202 may retrieve this information from the driver information database 312. Additionally, the driving license evaluation system 202 may communicate the new driver's contact information (e.g., mailing address, e-mail address, phone number), such that the driver's license issuing authority system 216 may issue and send the driver's license to the new driver. In some examples, where the driver's license issuing authority system 216 sends the driver's license to a mailing address, the driver's license may be a physical card or other certification of the driver's driving skills. In other examples, where the driver's license issuing authority system 216 sends the driver's license to an email-address, phone number, or through any other electronic communication channel, the driver's license may be an electronic card or other certification of the driver's driving skills. In other examples, the driver's license issuing authority system 216 may accept the recommendation from the driving license evaluation system 202, but still require the new driver to visit a local driver's license issuing authority to obtain the driver's license. The visit may be required to complete various formalities (e.g., paperwork, vision test, other medical tests, etc.). Where the new driver is still required to visit the DMV, the visit may be expedited (e.g., by being placed into a priority queue) as a reward for completing the requirements, the written test, and driving test remotely.

Even where the new driver has not taken advantage of all functionality offered by the driving license evaluation system 202, the new driver's visit to the DMV may be expedited. For example, where a driver has completed all requirements and has taken the written test, the visit (e.g., taking the driving test, completing formalities, etc.) may be expedited as a reward for completing the rewards and the written test remotely.

It will be appreciated that the functionality of the driving license evaluation system 202, as described in this disclosure, may be extended to new drivers of different ages, different types of licenses, etc. For example, in certain countries/states, a new driver above the age of 18 may not be required to complete a driver's education course at a driving school. Accordingly, the standardized process may be adjusted per the local requirements. The driving license evaluation system 202 may also be extended to evaluate a driver for a non-car license (e.g., motorcycles, trucks, buses, boats, etc.). In such examples, the standardized process may accordingly be adjusted per the local requirements for the specific license type.

As described in this disclosure, the driving license evaluation system 202 reduces the need for human evaluation of a new driver. The driving school course, the written test, and the driving test may be standardized, and processed by an objective evaluator. Additionally, the capabilities of the driving license evaluation system 202 may advantageously reduce the need for new drivers to visit a local driver's license issuing authority to obtain a driver's license.

In an example embodiment, the new driver's driving school performance, writing test score and/or result, and driving test score and/or result may be communicated to one or more insurance companies. The insurance companies may subsequently use this information to provide rewards and benefits to the new driver for completing the training requirements, written tests, and driving tests. For example, the insurance companies may offer reduced premiums or deductibles on existing insurance policies (e.g., of the new driver's parents/guardians), where such reductions may escalate as the new driver advances through the various stages of the driving license acquisition process. These rewards may incentivize the new driver's parents/guardians to encourage and supervise practice of the new driver. In another example, the insurance companies may provide coupons (e.g., for insurance services, gas services, car repair services, etc.) upon completion of the various stages of the driving license acquisition process. The coupons may be redeemable by the new driver, for example, once the new driver has obtained a fully qualified driver's license. In yet another example, the insurance companies may guarantee issuance or terms (e.g., premiums, deductibles) of an insurance policy for the new driver, once the new driver obtains a driver's license. These guarantees may be based on the new driver's performance scores and test scores achieved during the driving license acquisition process. It will be appreciated that a standardized evaluation of new drivers may advantageously allow insurance companies to offer lower insurance companies for new drivers.

While the disclosure has been described with respect to specific examples including presently illustrative modes of carrying out the disclosure, a person having ordinary skill in the art, after review of the entirety disclosed herein, will appreciate that there are numerous variations and permutations of the above-described systems and techniques that fall within the spirit and scope of the disclosure.

What is claimed is:

1. A driving license evaluation system comprising:
    at least one processor; and
    memory storing computer-readable instructions, that when executed by the at least one processor, cause the driving license evaluation system to:
        obtain a set of requirements to be completed for acquiring a driver's license;
        receive first vehicle operation data indicating a manner in which a driver operates a vehicle;
        dynamically construct a driver-specific written test for the driver, the driver-specific written test corresponding to a driver's location, and wherein questions included in the driver-specific written test are generated or selected using the first vehicle operation data indicating the manner in which the driver operates the vehicle;
        determine whether the set of requirements has been satisfied based on the first vehicle operation data received;
        administer the driver-specific written test responsive to determining the set of requirements has been satisfied;
        determine whether a written test result for the driver-specific written test is a passing written test result;
        administer a driving test responsive to determining the written test result is the passing written test result, wherein the driving test indicates a driving route;
        during a performance of the driving test:
            receive second vehicle operation data associated with the vehicle during the performance of the driving test;
            compare the second vehicle operation data to one or more requirements of the driving test;
            determine a driving test result based, at least in part, on a comparison of at least a portion of the second vehicle operation data received during the performance of the driving test to the driving route; and
        communicate the written test result and the driving test result to a remote system.

2. The driving license evaluation system of claim 1 wherein the computer-readable instructions, when executed by the at least one processor, further cause the driving license evaluation system to:
    provide a recommendation to the remote system indicating whether the driver's license should be issued based on at least the written test result and the driving test result.

3. The driving license evaluation system of claim 2 wherein the remote system is associated with a driver's license issuing authority.

4. The driving license evaluation system of claim 1 wherein the remote system is associated with a driving school.

5. The driving license evaluation system of claim 1 wherein the computer-readable instructions, when executed by the at least one processor, further cause the driving license evaluation system to:
    provide an interface at which the driver-specific written test is administered.

6. The driving license evaluation system of claim 1 wherein the computer-readable instructions, when executed by the at least one processor, further cause the driving license evaluation system to:
    provide an interface at which the driving test is presented.

7. The driving license evaluation system of claim 1 wherein the driving route is composed of one or more contiguous mini-routes.

8. The driving license evaluation system of claim 7 wherein the computer-readable instructions, when executed by the at least one processor, further cause the driving license evaluation system to:
    select the one or more contiguous mini-routes based on a randomization algorithm, a preference to include mini-routes not previously attempted by the vehicle, or a combination thereof.

9. The driving license evaluation system of claim 7 wherein the one or more contiguous mini-routes are associated with a difficulty level, and wherein an average difficulty level of the one or more contiguous mini-routes is greater than or equal to a minimum difficulty level, and wherein the average difficulty level of the one or more contiguous mini-routes is less than or equal to a maximum difficulty level.

10. The driving license evaluation system of claim 1:
    wherein the driving test identifies a speed limit; and
    wherein the computer-readable instructions, when executed by the at least one processor, further cause the driving license evaluation system to:
        determine a speed of the vehicle based on at least the portion of the second vehicle operation data received during the performance of the driving test; and
        determine the driving test result further based on the comparison between the speed of the vehicle and the speed limit.

11. The driving license evaluation system of claim 1 wherein the computer-readable instructions, when executed by the at least one processor, further cause the driving license evaluation system to:
    determine whether a driving activity has occurred during the performance of the driving test based on at least the portion of the second vehicle operation data collected during the performance of the driving test; and
    determine the driving test result further based on one or more occurrences of the driving activity during the performance of the driving test; and wherein the driving activity includes at least one of acceleration above a predetermined acceleration threshold, braking above a predetermined deceleration threshold, impact to a body of the vehicle, air bag deployment, headlights usage, brake light operation, opening or closing of a vehicle door, windshield wiper usage, turn signal usage, seat belt usage, and phone usage within the vehicle.

12. A computer-assisted method of evaluating a new driver for a driver's license comprising:

obtaining a set of requirements to be completed for acquiring a driver's license;

receiving first vehicle operation data associated with a vehicle;

determining whether the set of requirements has been satisfied based on the first vehicle operation data received;

dynamically constructing a driver-specific written test corresponding to a driver's location, wherein questions included in the driver-specific written test are generated or selected using the first vehicle operation data indicating one or more driving habits indicated by the first vehicle operation data, administering the driver-specific written test responsive to determining the set of requirements has been satisfied;

determining whether a written test result for the driver-specific written test is a passing written test result;

administering a driving test responsive to determining the written test result is the passing written test result, wherein the driving test indicates a driving route;

during a performance of the driving test:
  receiving second vehicle operation data associated with the vehicle during the performance of the driving test; and
  comparing the second vehicle operation data to one or more requirements of the driving test;

determining a driving test result based, at least in part, on a comparison of at least a portion of the second vehicle operation data received during the performance of the driving test to the driving route; and communicating the written test result and the driving test result to a remote system.

13. The computer-assisted method of claim 12 further comprising:

providing a recommendation to the remote system indicating whether the driver's license should be issued based on at least the written test result and the driving test result.

14. The computer-assisted method of claim 13 wherein the remote system is associated with a driver's license issuing authority.

15. The computer-assisted method of claim 12 wherein the remote system is associated with a driving school.

16. The computer-assisted method of claim 12 wherein the driving route is composed of one or more contiguous mini-routes.

17. The computer-assisted method of claim 16 further comprising:

selecting the one or more contiguous mini-routes based on a randomization algorithm, a preference to include mini-routes not previous attempted by the vehicle, or a combination thereof.

18. The computer-assisted method of claim 16 wherein the one or more contiguous mini-routes are associated with a difficulty level, and wherein an average difficulty level of the one or more contiguous mini-routes is greater than or equal to a minimum difficulty level, and wherein the average difficulty level of the one or more contiguous mini-routes is less than or equal to a maximum difficulty level.

19. The computer-assisted method of claim 12 further comprising:

determining a speed of the vehicle based on at least the portion of the second vehicle operation data received during the performance of the driving test; and determining the driving test result further based on the comparison between the speed of the vehicle and a speed limit.

20. The computer-assisted method of claim 12 further comprising:

determining whether a driving activity has occurred during the performance of the driving test based on at least the portion of the second vehicle operation data collected during the performance of the driving test; and determining the driving test result further based on occurrences of unsafe driving; and wherein the driving activity includes at least one of acceleration above a predetermined acceleration threshold, braking above a predetermined deceleration threshold, impact to a body of the vehicle, air bag deployment, headlights usage, brake light operation, opening or closing of a vehicle door, windshield wiper usage, turn signal usage, seat belt usage, and phone usage within the vehicle.

* * * * *